United States Patent
Piao et al.

(10) Patent No.: US 12,080,873 B2
(45) Date of Patent: Sep. 3, 2024

(54) NEGATIVE ELECTRODE AND SECONDARY BATTERY INCLUDING THE NEGATIVE ELECTRODE

(71) Applicant: LG ENERGY SOLUTION, LTD., Seoul (KR)

(72) Inventors: Li Lin Piao, Daejeon (KR); Je Young Kim, Daejeon (KR); Sang Wook Woo, Daejeon (KR); Hee Won Choi, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 577 days.

(21) Appl. No.: 17/420,876

(22) PCT Filed: Jan. 14, 2020

(86) PCT No.: PCT/KR2020/000695
§ 371 (c)(1),
(2) Date: Jul. 6, 2021

(87) PCT Pub. No.: WO2020/149622
PCT Pub. Date: Jul. 23, 2020

(65) Prior Publication Data
US 2022/0077451 A1    Mar. 10, 2022

(30) Foreign Application Priority Data
Jan. 14, 2019   (KR) .................. 10-2019-0004798

(51) Int. Cl.
*H01M 4/133*   (2010.01)
*H01M 4/02*    (2006.01)
(Continued)

(52) U.S. Cl.
CPC ........... *H01M 4/133* (2013.01); *H01M 4/366* (2013.01); *H01M 4/587* (2013.01); *H01M 4/625* (2013.01);
(Continued)

(58) Field of Classification Search
None
See application file for complete search history.

(56) References Cited

U.S. PATENT DOCUMENTS 11,888,110 B2 *   1/2024   Li .................. H01M 10/049
2013/0143127 A1   6/2013   Nakamura et al.
(Continued)

FOREIGN PATENT DOCUMENTS

CN    105659417 A    6/2016
CN    108140825 A    6/2018
(Continued)

OTHER PUBLICATIONS

WO 2020/0149622 (PCT/KR2020/000695) English machine translation (Year: 2020).*
(Continued)

*Primary Examiner* — Scott J. Chmielecki
(74) *Attorney, Agent, or Firm* — Birch, Stewart, Kolasch & Birch, LLP

(57) ABSTRACT

A negative electrode and a secondary battery including the negative electrode. The negative electrode including a current collector and a negative electrode active material layer, wherein the negative electrode active material layer includes negative electrode active material particles, the negative electrode active material particles include natural graphite particles and a carbon coating layer disposed on the natural graphite particles. The negative electrode active material particles have a $D_{50}$ of 6 μm to 9.2 μm and a half-width of 5.0 μm to 5.5 μm based on a particle size distribution, and
(Continued)

the specific surface area of the negative electrode active material particles is from 0.6 m²/g to 2.2 m²/g.

10 Claims, 2 Drawing Sheets

(51) Int. Cl.
  *H01M 4/36* (2006.01)
  *H01M 4/587* (2010.01)
  *H01M 4/62* (2006.01)
  *H01M 10/0525* (2010.01)
(52) U.S. Cl.
  CPC .. *H01M 10/0525* (2013.01); *H01M 2004/021* (2013.01); *H01M 2004/027* (2013.01)

(56) References Cited

U.S. PATENT DOCUMENTS

| | | | |
|---|---|---|---|
| 2014/0356707 A1* | 12/2014 | Kwon | H01M 4/587 427/113 |
| 2016/0181612 A1 | 6/2016 | Lee et al. | |
| 2017/0133680 A1 | 5/2017 | Cheng et al. | |
| 2017/0187041 A1 | 6/2017 | Yamada et al. | |
| 2017/0358824 A1* | 12/2017 | Harada | H01M 10/0585 |
| 2017/0373315 A1 | 12/2017 | Lee et al. | |
| 2018/0013146 A1* | 1/2018 | Yamada | H01M 4/587 |
| 2018/0151869 A1* | 5/2018 | Matsuhara | H01M 4/485 |
| 2018/0151873 A1* | 5/2018 | Matsuno | H01M 4/625 |
| 2018/0342755 A1 | 11/2018 | Yoon et al. | |
| 2018/0351171 A1 | 12/2018 | Jeon et al. | |
| 2019/0165373 A1 | 5/2019 | Lee et al. | |
| 2022/0069303 A1* | 3/2022 | Okamura | H01M 4/625 |
| 2023/0322572 A1* | 10/2023 | Yushin | H01M 50/403 29/623.5 |
| 2023/0357022 A1* | 11/2023 | Hirano | B32B 9/007 |

FOREIGN PATENT DOCUMENTS

| | | |
|---|---|---|
| EP | 3 136 481 A1 | 3/2017 |
| EP | 3 168 909 A1 | 5/2017 |
| ER | 10-2013-0015967 A | 2/2013 |
| JP | 5903959 B2 | 4/2016 |
| KR | 10-2013-0101002 A | 9/2013 |
| KR | 10-1446698 B1 | 10/2014 |
| KR | 10-2014-0132791 A | 11/2014 |
| KR | 10-2014-0140323 A | 12/2014 |
| KR | 10-2014-0140952 A | 12/2014 |
| KR | 10-1631735 B1 | 6/2016 |
| KR | 10-1790400 B1 | 10/2017 |
| KR | 10-2018-0000145 A | 1/2018 |
| KR | 10-2018-0130182 A | 12/2018 |

OTHER PUBLICATIONS

Extended European Search Report for European Application No. 20741904.5, dated Nov. 25, 2021.
International Search Report (PCT/ISA/210) issued in PCT/KR2020/000695, dated Apr. 28, 2020.

* cited by examiner

NEGATIVE ELECTRODE AND SECONDARY BATTERY INCLUDING THE NEGATIVE ELECTRODE

TECHNICAL FIELD

Cross-Reference to Related Applications

This application claims the benefit of Korean Patent Application No. 10-2019-0004798, filed on Jan. 14, 2019, in the Korean Intellectual Property Office, the disclosure of which is incorporated herein in its entirety by reference.

TECHNICAL FIELD

The present invention relates to a negative electrode and a secondary battery including the same, the negative electrode including a current collector and a negative electrode active material layer, wherein the negative electrode active material layer includes negative electrode active material particles, the negative electrode active material particles include natural graphite and a carbon coating layer disposed on the natural graphite, on a particle size distribution, the negative electrode active material particles have a $D_{50}$ of 6 μm to 9.2 μm and a half-width of 5.0 μm to 5.5 μm, and the specific surface area of the negative electrode active material particles is 0.6 m$^2$/g to 2.2 m$^2$/g.

BACKGROUND ART

Demands for the use of alternative energy or clean energy are increasing due to the rapid increase in the use of fossil fuel, and as a part of this trend, the most actively studied field is a field of electricity generation and electricity storage using an electrochemical reaction.

Currently, a typical example of an electrochemical device using such electrochemical energy is a secondary battery and the usage areas thereof are increasing more and more. In recent years, as technology development of and demand for portable devices such as portable computers, mobile phones, and cameras have increased, demands for secondary batteries as an energy source have been significantly increased. In general, a secondary battery is composed of a positive electrode, a negative electrode, an electrolyte, and a separator. The negative electrode includes a negative electrode active material for intercalating and de-intercalating lithium ions from the positive electrode, and as the negative electrode active material, a graphite-based active material, for example, natural graphite or artificial graphite may be used.

As the charging and discharging of the battery continues, the volume of the natural graphite expands, thereby deteriorating the lifetime performance of the battery. Typically, in order to control the volume expansion, a carbon coating layer has been disposed on natural graphite. However, it is difficult to reduce the stress inside the natural graphite only by using a carbon coating layer, and a region in which electrolyte side reaction occurs is not sufficiently controlled, so that the control of the volume expansion is limited.

Therefore, there is a demand for a novel method which is capable of effectively controlling the volume expansion of natural graphite during charge/discharge of a battery.

DISCLOSURE OF THE INVENTION

Technical Problem

An aspect of the present invention provides a negative electrode and a secondary battery including the same, the negative electrode capable of improving the rapid charging performance and lifespan properties of a battery by effectively controlling the volume expansion and electrolyte side reactions of natural graphite when charging and discharging the battery.

Technical Solution

According to an aspect of the present invention, there is provided a negative electrode including a current collector and a negative electrode active material layer, wherein the negative electrode active material layer includes negative electrode active material particles, the negative electrode active material particles include natural graphite and a carbon coating layer disposed on the natural graphite, on a particle size distribution, the negative electrode active material particles have a $D_{50}$ of 6 μm to 9.2 μm and a half-width of 5.0 μm to 5.5 μm, and the specific surface area of the negative electrode active material particles is 0.6 m$^2$/g to 2.2 m$^2$/g.

According to another aspect of the present invention, there is provided a secondary battery including the negative electrode.

Advantageous Effects

According to the present invention, negative electrode active material particles of a proper size are used, so that the stress inside the negative electrode active material particles may be mitigated. Thus, the degree of volume expansion of natural graphite in the negative electrode active material particles may be reduced during charging and discharging of a battery. In addition, since negative electrode active material particles having an appropriate half-width on a particle size distribution are used, a current may be evenly transmitted into a negative electrode, so that a problem in which lithium precipitation of a specific portion easily occurs may be reduced. Accordingly, the rapid charging performance of the battery may be improved. Furthermore, since internal pores are controlled to allow negative electrode active material particles having a low specific surface area to be used, the volume expansion of natural graphite in the negative electrode active material particles may be further controlled. The lifespan properties of the battery may be improved through the volume expansion control.

MODE FOR CARRYING OUT THE INVENTION

Figure 1:
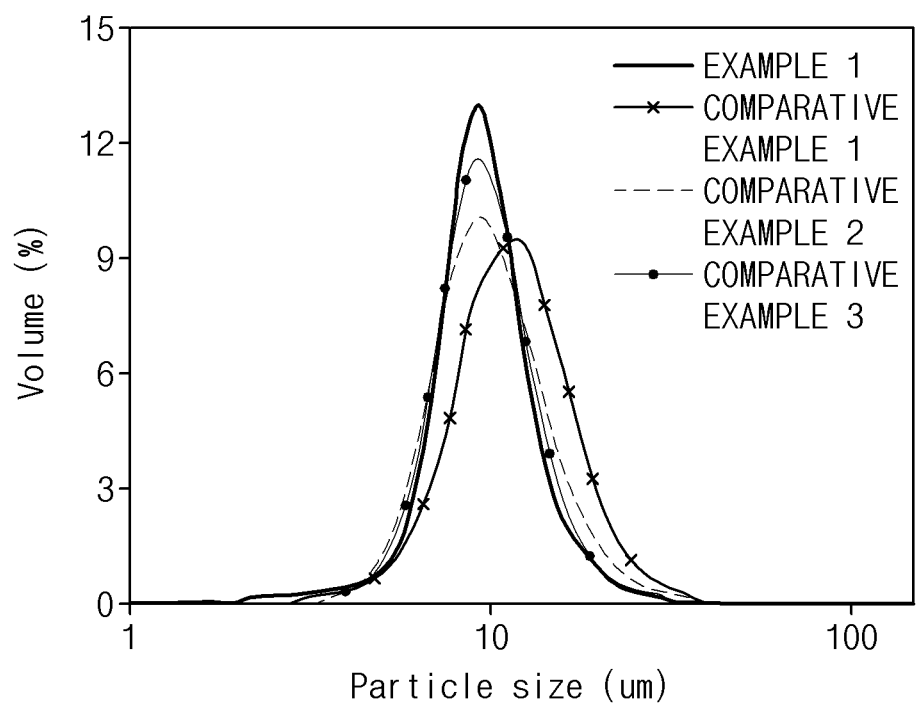
FIG. 1 is a graph showing the particle size distribution of negative electrode active material particles used in each of Example 1, Comparative Example 1, Comparative Example 2, and Comparative Example 3.

Hereinafter, the present invention will be described in more detail to facilitate understanding of the present invention.

It will be understood that words or terms used in the present specification and claims shall not be interpreted as having the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

The terminology used herein is for the purpose of describing particular exemplary embodiments only and is not intended to be limiting of the present invention. The terms of a singular form may include plural forms unless the context clearly indicates otherwise.

In the present specification, it should be understood that the terms "include," "comprise," or "have" are intended to specify the presence of stated features, numbers, steps, elements, or combinations thereof, but do not preclude the presence or addition of one or more other features, numbers, steps, elements, or combinations thereof.

In the present specification, $D_{10}$, $D_{50}$, and $D_{90}$ may be respectively defined as a particle diameter corresponding to 10%, 50%, and 90% of the cumulative volume in the particle size distribution curve of particles. The $D_{10}$, $D_{50}$, and $D_{90}$ may be measured by, for example, a laser diffraction method. The laser diffraction method generally enables measurement of a particle diameter from a sub-micron region to several millimeters, so that results of high reproducibility and high resolution may be obtained.

In the present specification, a specific surface area (specifically the specific surface area of negative electrode active material particles) may be measured by the Brunauer-Emmett-Teller (BET) method. For example, using a porosimetry analyzer (Bell Japan Inc, Belsorp-II mini), the specific surface area may be measured by the BET 6-point method by the nitrogen gas adsorption/distribution method.

In the present specification, pore volume (in particular, the pore volume of negative electrode active material particles) may be measured through a porosimetry analyzer (Bell Japan Inc, Belsorp-II mini).

In the present specification, tap density may be a density calculated by placing 40 g of negative electrode active material particles in a container and tapping the same for 1000 times.

<Negative Electrode>

A negative electrode according to an embodiment of the present invention may include a current collector and a negative electrode active material layer, wherein the negative electrode active material layer includes negative electrode active material particles, the negative electrode active material particles include natural graphite particles and a carbon coating layer disposed on the natural graphite particles, wherein the negative electrode active material particles have a $D_{50}$ of 6 μm to 9.2 μm and a half-width of 5.0 μm to 5.5 μm based on a particle distribution, and the specific surface area of the negative electrode active material particles is from 0.6 m²/g to 2.2 m²/g.

The current collector is not particularly limited as long as it has conductivity without causing a chemical change in a battery. For example, as the current collector, copper, stainless steel, aluminum, nickel, titanium, fired carbon, or aluminum or stainless steel that is surface-treated with one of carbon, nickel, titanium, silver, and the like may be used. Specifically, a transition metal which adsorbs carbon well such as copper and nickel may be used as the current collector. The thickness of the current collector may be from 6 μm to 20 μm, but the thickness of the current collector is not limited thereto.

The negative electrode active material layer may be disposed on the current collector. The negative electrode active material layer may be disposed on at least one surface of the current collector, specifically on one surface or both surfaces thereof.

The negative electrode active material layer may include a negative electrode active material particles.

The negative electrode active material particles may include natural graphite particles and a carbon coating layer.

Since the natural graphite is included in the negative electrode active material particles, the capacity of the battery may be improved.

The natural graphite may be natural graphite formed by modifying flaky natural graphite particles and having a spherical shape or a shape close to a spherical shape. Specifically, the natural graphite may be formed by aggregating the flaky natural graphite particles. More specifically, the natural graphite may be formed by rolling or wearing flaky natural graphite particles through a mechanical process. Accordingly, when the inside of the natural graphite is observed, there may be boundary surfaces present therein showing that flaky natural graphite are aggregated.

The natural graphite may have an average particle diameter ($D_{50}$) of 5.8 μm to 9.2 μm, specifically 7 μm to 9 μm, more specifically 8 μm to 9 μm. When the above range is satisfied, the volume expansion of the negative electrode during charge/discharge of the battery may be suppressed.

The carbon coating layer may include at least any one of amorphous carbon and crystalline carbon.

The crystalline carbon may further improve the conductivity of the natural graphite. The crystalline carbon may include at least any one selected from the group consisting of fluorene, a carbon nanotube, and graphene.

The amorphous carbon may appropriately maintain the strength of the coating layer, thereby suppressing the expansion of the natural graphite. The amorphous carbon may be at least any one carbide selected from the group consisting of tar, pitch, and other organic materials, or a carbon-based material formed by using hydrocarbon as a source of chemical vapor deposition.

The carbide of the other organic materials may be a carbide of an organic material selected from the group consisting of sucrose, glucose, galactose, fructose, lactose, mannose, ribose, aldohexose or ketohexose carbides and combinations thereof.

The hydrocarbon may be substituted or unsubstituted aliphatic or alicyclic hydrocarbon, or substituted or unsubstituted aromatic hydrocarbon. Aliphatic or alicyclic hydrocarbon of the substituted or unsubstituted aliphatic or alicyclic hydrocarbon may be methane, ethene, ethylene, acetylene, propene, butane, butene, pentene, isobutene or hexane, and the like. Aromatic hydrocarbon of the substituted or unsubstituted aromatic hydrocarbon may be benzene, toluene, xylene, styrene, ethylbenzene, diphenylmethane, naphthalene, phenol, cresol, nitrobenzene, chlorobenzene, indene, coumarone, pyridine, anthracene, or phenanthrene, and the like.

The carbon coating layer may be included in the negative electrode active material particles in an amount of 1 wt % to 15 wt %, specifically 2 wt % to 10 wt %, more specifically wt % 3 wt % to 7 wt %. When the above range is satisfied, the specific surface area of the negative electrode active material particles is reduced, so that side reactions of the negative electrode active material particles and an electrolyte may be reduced and an excessive volume expansion of the negative electrode may be suppressed.

On a particle size distribution, the negative electrode active material particles may have a $D_{50}$ of 6 μm to 9.2 μm, specifically 7 μm to 9.2 μm, more specifically 8 μm to 9.1

μm. When the above range is satisfied, it means that the particle diameter of natural graphite in the negative electrode active material particles is small, and furthermore, it means that the size of flaky natural graphite particles constituting the natural graphite is small. Therefore, when the above range is satisfied, during the charge/discharge of the battery, the internal stress of the negative electrode active material particles, specifically, the natural graphite, may be easily mitigated, so that the volume expansion of the negative electrode active material particles may be suppressed.

Specifically, when the negative electrode active material particles have a $D_{50}$ of less than 6 μm, it is difficult to perform a spherization treatment to satisfy the above size, so that a yield may be deteriorated or there may be an increase in price. Also, side reactions between the negative electrode active material particles and an electrolyte are increased, so that battery efficiency is reduced. On the other hand, when the negative electrode active material particles have a D50 of greater than 9.2 μm, it means that the size of flaky natural graphite particles constituting natural graphite inside the negative electrode active material particles is large. When the flaky natural graphite particles having a large size become spherical natural graphite after being subjected to a spherization process, there are too many interfaces present inside the spherical natural graphite, and accordingly, internal stress is excessively increased. Therefore, during charging and discharging of the battery, the volume of the negative electrode is excessively expanded, so that a problem in which the lifespan of the battery is deteriorated may occur.

On a particle size distribution, the negative electrode active material particles may have a half-width of 5.0 μm to 5.5 μm, specifically 5.2 μm to 5.4 μm, more specifically 5.2 μm to 5.3 μm. When the half-width is as too small as less than 5.0 μm, in a manufacturing process of the negative electrode active material particles, there is a problem in that a yield is too low. On the other hand, when the half-width is greater than 5.5 μm, since particle size distribution is not even, a current is not evenly transmitted within the negative electrode, so that many portions in which lithium precipitation easily occurs are generated, thereby deteriorating the rapid charging performance of the battery. Also, the negative electrode is excessively expanded, so that a problem in which the lifespan of the battery is deteriorated may occur. When preparing the negative electrode active material particles, flaky natural graphite particles which are small in size are used and a step of removing internal pores of spherical natural graphite is performed, so that a problem of nonuniform size according to an internal pores is solved, and thus, the half-width may satisfy 5.5 μm or less. The half-width corresponds to a horizontal axis width of a point corresponding to the half value of the maximum vertical axis value of the highest peak on the particle size distribution.

On a particle size distribution, the $D_{90}/D_{10}$ of the negative electrode active material particles may satisfy $1.5 \leq D_{90}/D_{10} \leq 2.3$, specifically $1.8 \leq D_{90}/D_{10} \leq 2.3$, more specifically $2.0 \leq D_{90}/D_{10} \leq 2.3$. Since the volume of the internal pores inside the negative electrode active material particles is at a low level, the above range may be satisfied. When the above range is satisfied, particle size distribution become even, so that the rapid charging of the battery may be improved.

The negative electrode active material may have a specific surface area of 0.6 m²/g to 2.2 m²/g, specifically 0.8 m²/g to 2.1 m²/g, more specifically, 0.9 m²/g to 2.1 m²/g. Since the volume of the internal pores inside the negative electrode active material particles is at a low level, the above range may be satisfied. In other words, it is difficult to achieve the specific surface area simply by forming a carbon coating layer on typical natural graphite or by controlling the shape of the natural graphite (for example, a spherical shape). Since a technique of applying pressure to the natural graphite to control the internal pores of the natural graphite is accompanied, it is possible to achieve the specific surface area. When the above range is satisfied, the internal pores in the negative electrode active material particles are reduced, and thus, side reactions between the negative electrode active material particles and an electrolyte may be reduced and an excessive volume expansion of the negative electrode may be suppressed. Accordingly, the lifespan properties of the battery may be improved.

Specifically, when the specific surface area is less than 0.6 m²/g, since the internal pores and the specific surface area of the negative electrode active material particles are greatly reduced, negative electrode interface resistance is excessively increased during charging and discharging of the battery, and the intercalation/de-intercalation of lithium ions are not facilitated, so that the rapid charging performance is deteriorated and the capacity of the battery may be reduced. On the other hand, when the specific surface area is greater than 2.2 m²/g, side reactions between the negative electrode active material particles and an electrolyte are increased, causing the volume of the negative electrode to excessively expand during charging and discharging of the battery, so that the lifespan of the battery may be reduced.

The pore volume of the negative electrode active material particles may be $1 \times 10^{-3}$ cm³/g to $14.8 \times 10^{-3}$ cm³/g, specifically $3 \times 10^{-3}$ cm³/g to $14 \times 10^{-3}$ cm³/g, more specifically $5 \times 10^{-3}$ cm³/g to $14 \times 10^{-3}$ cm³/g. It was possible to satisfy the above range since a technique of applying pressure to the natural graphite to control internal pores of the natural graphite was accompanied. Therefore, the pore volume may be smaller than the pore volume of a typical natural graphite to which such a technique has not been applied. When the above during charging and pore volume range is satisfied, discharging of the battery, side reactions between an electrolyte and the negative electrode active material particles may be effectively suppressed and the volume expansion of the negative electrode active material particles are suppressed, so that the lifespan properties of the battery may be improved.

The tap density of the negative electrode active material particles may be 1.00 g/cc 1.20 g/cc, specifically 1.05 g/cc to 1.15 g/cc, more specifically 1.05 g/cc to 1.10 g/cc. When the above range is satisfied, the shape of the negative electrode active material particles is a spherical shape or a shape close to a spherical shape, so that it means that negative electrode adhesive force may be improved.

The negative electrode may further include at least one of a binder and a conductive material.

The binder may include at least any one selected from the group consisting of a polyvinylidene fluoride-hexafluoropropylene copolymer (PVDF-co-HFP), polyvinylidenefluoride, polyacrylonitrile, polymethylmethacrylate, polyvinyl alcohol, carboxymethyl cellulose (CMC), starch, hydroxypropyl cellulose, regenerated cellulose, polyvinylpyrrolidone, poly tetrafluoroethylene, polyethylene, polypropylene, polyacrylic acid, an ethylene-propylene-diene monomer (EPDM), a sulfonated EPDM, styrene-butadiene rubber (SBR), fluorine rubber, polyacrylic acid, materials having the hydrogen thereof substituted with Li, Na, or Ca, and the like, and a combination thereof. In addition, the binder may include various copolymers thereof.

The conductive material is not particularly limited as long as it has conductivity without causing a chemical change in the battery. For example, graphite such as natural graphite or artificial graphite; a carbon-based material such as carbon black, acetylene black, Ketjen black, channel black, furnace black, lamp black, and thermal black; conductive fiber such as carbon fiber and metal fiber; a conductive tube such as a carbon nanotube; fluorocarbon powder; metal powder such as aluminum powder, and nickel powder; a conductive whisker such as zinc oxide and potassium titanate; a conductive metal oxide such as titanium oxide; a conductive material such as a polyphenylene derivative, and the like may be used.

<Method for Manufacturing Negative Electrode>

Although not limited thereto, the negative electrode active material of an embodiment described above may be prepared in the following manner. The method may include preparing flaky natural graphite, modifying the flaky natural graphite to spherical natural graphite, forming a coating layer on the surface of the spherical natural graphite, and removing internal pores of the spherical natural graphite.

In the preparing of the flaky natural graphite, the size of the flaky natural graphite is smaller than that of typical flaky natural graphite. Accordingly, in the step of modifying the flaky natural graphite to spherical natural graphite, the size of spherical natural graphite to be formed may be small.

In the modifying of the flaky natural graphite to spherical natural graphite, the modification method may be performed by, for example, using a vortex flow pulverizer.

The step of forming a coating layer on the surface of the spherical natural graphite may be performed by disposing a carbon precursor on the spherical natural graphite and subjecting the same to heat treatment. A coating layer formed thereby is the same as the carbon coating layer described in the aforementioned embodiment, and thus, a description thereof will be omitted. As the carbon coating layer is formed, the specific surface area of spherical natural graphite on which the carbon coating layer is formed may be further reduced.

In the step of removing internal pores of the spherical natural graphite, a method for removing the internal pores may be cold isostatic pressing (CIP). Specifically, the spherical natural graphite on which the carbon coating layer is formed is placed in a mold, and the mold is immersed in water. Thereafter, using the water as a medium, pressure is applied to the mold in which the spherical natural graphite on which the carbon coating layer is formed. The pressure may be 85 MPa to 95 MPa, specifically 85 MPa to 90 MPa. The duration during which the pressure is applied may be 60 seconds to 120 seconds, specifically 90 seconds to 100 seconds. By the above method, isotropic pressure is applied to the spherical natural graphite on which the carbon coating layer is formed, and thus, the internal pores of the spherical natural graphite may be removed. Accordingly, the specific surface area and internal pore volume of negative electrode active material particles to be prepared may be lowered. Also, since internal pores are removed, the particle size distribution of the negative electrode active material particles may be adjusted, so that half-width range, D50 range, specific surface area range of negative electrode active material particles of the above-described embodiment may be satisfied.

<Secondary Battery>

A secondary battery according to yet another embodiment of the present invention may include a negative electrode, and the negative electrode may be the same as the negative electrode of the embodiment described above.

Specifically, the secondary battery may include the negative electrode, a positive electrode, a separator interposed between the positive electrode and the negative electrode, and an electrolyte. The negative electrode is the same as the negative electrode described above. Since the negative electrode has been described above, a detailed description thereof will be omitted.

The positive electrode may include a positive electrode current collector, and a positive electrode active material layer formed on the positive electrode current collector and including the positive electrode active material.

In the positive electrode, the positive electrode current collector is not particularly limited as long as it has conductivity without causing a chemical change in the battery. For example, stainless steel, aluminum, nickel, titanium, fired carbon, or aluminum or stainless steel that is surface-treated with one of carbon, nickel, titanium, silver, and the like may be used. Also, the positive electrode current collector may typically have a thickness of 3 µm to 500 µm, and microscopic irregularities may be formed on the surface of the positive electrode current collector to improve the adhesion of the positive electrode active material. For example, the positive electrode current collector may be used in various forms such as a film, a sheet, a foil, a net, a porous body, a foam, and a non-woven body.

The positive electrode active material may be a positive electrode active material commonly used in the art. Specifically, the positive electrode active material may be a layered compound such as a lithium cobalt oxide ($LiCoO_2$) and a lithium nickel oxide ($LiNiO_2$), or a compound substituted with one or more transition metals; a lithium iron oxide such as $LiFe_3O_4$; a lithium manganese oxide such as $Li_{1+c1}Mn_{2-c1}O_4$ ($0 \leq c1 \leq 0.33$), $LiMnO_3$, $LiMn_2O_3$, and $LiMnO_2$; lithium copper oxide ($Li_2CuO_2$); a vanadium oxide such as $LiV_3O_8$, $V_2O_5$, and $Cu_2V_2O_7$; a Ni-site type lithium nickel oxide represented by the formula $LiNi_{1-c2}M_{c2}O_2$ (wherein M is any one of Co, Mn, Al, Cu, Fe, Mg, B or Ga, and $0.01 \leq c2 \leq 0.3$); a lithium manganese composite oxide represented by the formula $LiMn_{2-c3}M_{c3}O_2$ (wherein, M is any one of Co, Ni, Fe, Cr, Zn, or Ta, and $0.01 \leq c3 \leq 0.1$), or by the formula $Li_2Mn_3MO_8$ (wherein, M is any one of Fe, Co, Ni, Cu, or Zn); $LiMn_2O_4$ having a part of Li in the formula substituted with an alkaline earth metal ion, and the like, but is not limited thereto. The positive electrode may be a Li-metal.

The positive electrode active material layer may include a positive electrode conductive material and a positive electrode binder, together with the positive electrode active material described above.

At this time, the positive electrode conductive material is used to impart conductivity to an electrode, and any positive electrode conductive material may be used without particular limitation as long as it has electronic conductivity without causing a chemical change in a battery to be constituted. Specific examples thereof may include graphite such as natural graphite or artificial graphite; a carbon-based material such as carbon black, acetylene black, Ketjen black, channel black, furnace black, lamp black, thermal black, and carbon fiber; metal powder or metal fiber of such as copper, nickel, aluminum, and silver; a conductive whisker such as a zinc oxide whisker and a potassium titanate whisker; a conductive metal oxide such as titanium oxide; or a conductive polymer such as a polyphenylene derivative, and any one thereof or a mixture of two or more thereof may be used.

In addition, the positive electrode binder serves to improve the bonding between positive electrode active material particles and the adhesion between the positive electrode active material and the positive electrode current collector. Specific examples thereof may include polyvinylidene fluoride (PVDF), a polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene monomer (EPDM), a sulfonated EPDM, styrene-butadiene rubber (SBR), fluorine rubber, or various copolymers thereof, and any one thereof or a mixture of two or more thereof may be used.

The separator is to separate the negative electrode and the positive electrode and to provide a movement path for lithium ions. Any separator may be used without particular limitation as long as it is a separator commonly used in a secondary battery. Particularly, a separator having excellent moisture-retention of an electrolyte as well as low resistance to ion movement in the electrolyte is preferable. Specifically, a porous polymer film, for example, a porous polymer film manufactured using a polyolefin-based polymer such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous non-woven fabric, for example, a non-woven fabric formed of glass fiber having a high melting point, or polyethylene terephthalate fiber, and the like may be used as the separator. Also, a coated separator including a ceramic component or a polymer material may be used to secure heat resistance or mechanical strength, and may be selectively used having a single layered or a multi-layered structure.

The electrolyte may be an organic liquid electrolyte, an inorganic liquid electrolyte, a solid polymer electrolyte, a gel-type polymer electrolyte, a solid inorganic electrolyte, a molten-type inorganic electrolyte, and the like, which may be used in the preparation of a lithium secondary battery, but is not limited thereto.

Specifically, the electrolyte may include a non-aqueous organic solvent and a lithium salt.

As the non-aqueous organic solvent, for example, an aprotic organic solvent, such as N-methyl-2-pyrrolidone, propylene carbonate, ethylene carbonate, butylene carbonate, dimethyl carbonate, diethyl carbonate, γ-butyrolactone, 1,2-dimethoxy ethane, tetrahydrofuran, 2-methyl tetrahydrofuran, dimethyl sulfoxide, 1,3-dioxolane, formamide, dimethylformamide, dioxolane, acetonitrile, nitromethane, methyl formate, methyl acetate, phosphate triester, trimethoxy methane, a dioxolane derivative, sulfolane, methyl sulfolane, 1,3-dimethyl-2-imidazolidinone, a propylene carbonate derivative, a tetrahydrofuran derivative, ether, methyl propionate, and ethyl propionate may be used.

In particular, among the carbonate-based organic solvents, cyclic carbonates ethylene carbonate and propylene carbonate may be preferably used since they are organic solvents of a high viscosity having high permittivity to dissociate a lithium salt well. Furthermore, when such a cyclic carbonate is mixed with a linear carbonate of a low viscosity and low permittivity such as dimethyl carbonate and diethyl carbonate in an appropriate ratio, it is possible to prepare an electrolyte having a high electric conductivity, such that the electrolyte may be more preferably used.

As the metal salt, a lithium salt may be used. The lithium salt is a material which is easily dissolved in the non-aqueous electrolyte. For example, as an anion of the lithium salt, one or more selected from the group consisting of $F^-$, $Cl^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$ may be used.

In the electrolyte, in order to improve the lifespan properties of a battery, to suppress the decrease in battery capacity, and to improve the discharge capacity of the battery, one or more additives, for example, a halo-alkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N, N-substituted imidazolidine, ethylene glycol dialkyl ether, an ammonium salt, pyrrole, 2-methoxy ethanol, or aluminum trichloride, and the like may be further included other than the above electrolyte components.

According to yet another embodiment of the present invention, a battery module including the secondary battery as a unit cell, and a battery pack including the same are provided. The battery module and the battery pack include the secondary battery which has high capacity, high rate properties, and cycle properties, and thus, may be used as a power source of a medium-and-large sized device selected from the group consisting of an electric vehicle, a hybrid electric vehicle, a plug-in hybrid electric vehicle, and a power storage system.

Hereinafter, preferred embodiments of the present invention will be described in detail to facilitate understanding of the present invention. However, the embodiments are merely illustrative of the present invention, and thus, it will be apparent to those skilled in the art that various modifications and variations can be made without departing from the scope and spirit of the present invention as disclosed in the accompanying claims. It is obvious that such variations and modifications fall within the scope of the appended claims.

EXAMPLES AND COMPARATIVE EXAMPLES

Example 1: Manufacturing of Negative Electrode (1) Preparation of Negative Electrode Slurry Particles containing spherical natural graphite formed by modifying flaky natural graphite and including a coating layer (5 wt % in the negative electrode active material particles) disposed on the spherical natural graphite were used as negative electrode active material particles (subjected to a process (CIP) for controlling internal pores). The negative electrode active material particles had a $D_{50}$ of 9.0 μm, a half-width of 5.3 μm, a D90/D10 of 2.3, a tap density of 1.07 g/cc, and a pore volume of $14.0 \times 10^{-3}$ cm$^3$/g on a particle size distribution measured through a particle size distribution meter (Microtrac S3500).

The negative electrode active material particles, Super C65 as a conductive material, styrene butadiene rubber (SBR) as a binder, and carboxymethylcellulose (CMC) as a thickening ratio of agent were mixed in a weight 96.6:1:1.3:1.1, and then added with water to prepare a negative electrode slurry.

(2) Manufacturing of Negative Electrode

The negative electrode slurry was applied on a copper foil (current collector) at a loading amount of 3.6 mAh/cm$^2$ and then roll-pressed such that negative electrode porosity becomes 28%, followed by vacuum drying at about 130° C. for 8 hours to manufacture a negative electrode of Example 1.

Examples 2 and Comparative Examples 1 to 8: Manufacturing of Negative Electrode

A negative electrode was manufactured in the same manner as in Example 1 except that negative electrode active material particles as shown in Table 1 were used. Comparative Examples 1, 2, 4, and 7 were not subjected to a CIP process, and Comparative Example 7 is natural graphite having a pitch inserted thereinto.

TABLE 1

Physical properties of negative electrode active material particles

| | $D_{50}$ (μm) | Half-width (μm) | Specific surface area (m²/g) | $D_{90}/D_{10}$ | Tap density (g/cc) | Pore volume (cm³/g) |
|---|---|---|---|---|---|---|
| Example 1 | 9.0 | 5.3 | 2.1 | 2.3 | 1.07 | 14.0 × $10^{-3}$ |
| Example 2 | 9.2 | 5.5 | 2.0 | 2.0 | 1.17 | 10.0 × $10^{-3}$ |
| Comparative Example 1 | 11.0 | 9.7 | 2.4 | 2.6 | 1.03 | 16.0 × $10^{-3}$ |
| Comparative Example 2 | 9.4 | 7.7 | 3.2 | 2.5 | 1.13 | 21.1 × $10^{-3}$ |
| Comparative Example 3 | 9.1 | 6.4 | 2.2 | 2.2 | 1.08 | 14.5 × $10^{-3}$ |
| Comparative Example 4 | 18 | 5.5 | 2.2 | 2.3 | 1.11 | 9.0 × $10^{-3}$ |
| Comparative Example 5 | 9.1 | 5.5 | 3.3 | — | — | — |
| Comparative Example 6 | 9.0 | 9.1 | 2.0 | 2.8 | 1.01 | 9.6 × $10^{-3}$ |
| Comparative Example 7 | 8.1 | 8.0 | 1.8 | 3.1 | 1.09 | 8.3 × $10^{-3}$ |
| Comparative Example 8 | 4.5 | 5.5 | 2.1 | — | — | — |

In Table 1, the $D_{10}$, the $D_{90}/D_{10}$, the half-width are values identified on a particle size distribution which has been derived through a particle size distribution meter (Microtrac S3500). In particular, the half-width corresponds to a horizontal axis width of a point corresponding to the half value of the maximum vertical axis value of the highest peak on the particle size distribution (see FIG. 1). In Table 1, the tap density is a density calculated by placing 40 g of negative electrode active material particles in a container and tapping the same for 1000 times. In Table 1, the pore volume and the specific surface area were measured through a porosimetry analyzer (Bell Japan Inc, Belsorp-II mini).

Experimental Example 1: Identification of Degree of Volume Expansion According to Charge/Discharge Cycle of Battery Using the negative electrode of each of Examples 1 and 2 and Comparative Examples 1 to 8, a battery was manufactured in the following manner.

As a positive electrode active material, $LiCoO_2$ was used. The positive electrode active material, carbon black which is a conductive material, polyvinylidene fluoride (PVDF) which is a binder were mixed at a weight ratio of 97.68: 1.2:1.12 to N-methyl-2-pyrrolidone (NMP) which is a solvent to prepare a positive electrode slurry.

The prepared positive electrode slurry was applied on an aluminum metal thin film having a thickness of 20 μm, which is a positive electrode current collector, and then dried. At this time, the temperature of circulated air was 110° C. Thereafter, the aluminum metal thin film applied with the positive electrode slurry and then dried was roll-pressed, and then dried in a vacuum oven of 130° C. for 2 hours to manufacture a positive electrode including a positive electrode active material layer.

The negative electrode (the negative electrode of each of Examples 1 and Comparative Examples 1 to 3), the manufactured positive electrode, and a porous polyethylene separator were assembled using a stacking method, and the assembled battery was injected with an electrolyte solution (ethylene carbonate (EC)/ethyl methyl carbonate (EMC)= 2/8 (volume ratio), lithium hexa fluoro phosphate (1 M of $LiPF_6$), and 0.5% of vinylene carbonate (VC)) to manufacture a lithium secondary battery.

The secondary battery was charged/discharged under the following conditions to evaluate the volume expansion rate of the negative electrode after 30 cycles, and the results are shown in Table 2.

Volume expansion rate of negative electrode (%)= [(thickness of negative electrode after 30th cycle)/initial thickness of negative electrode]× 100

Charging/discharging conditions: At 25° C., charging and discharging were performed at 0.1 C for the first cycle, at 0.2 C for the second cycle, and at 0.5 C from 3 to 30 cycles. After each charging and discharging, the idle time before the following cycle was set to 1 hour.

Charging condition: CC-CV mode (4.35 V, 0.05 C Voltage cut-off)

Discharging condition: CC mode (2.7 5V Voltage cut-off)

TABLE 2

| | Volume expansion rate (%) |
|---|---|
| Example 1 | 22 |
| Example 2 | 22 |
| Comparative Example 1 | 27 |
| Comparative Example 2 | 25 |
| Comparative Example 3 | 27 |
| Comparative Example 4 | 28 |
| Comparative Example 5 | 27 |
| Comparative Example 6 | 29 |
| Comparative Example 7 | 30 |
| Comparative Example 8 | 25 |

Referring to Table 2, it can be seen that in the case of Examples 1 and 2 in which negative electrode active material particles satisfying a proper $D_{50}$, half-width, and specific surface area were used, the volume expansion rate of the negative electrode was low.

Experimental Example 2: Evaluation of Rapid Charging Performance of Battery

A lithium (Li) metal thin film cut into a circular shape of 1.7671 cm² was prepared as a positive electrode. A porous polyethylene separator was interposed between the positive electrode and the negative electrode (the negative electrodes of Example 1 and Comparative Example 1), and then an electrolyte, in which vinylene carbonate was dissolved 0.5 wt % into a mixed solution in which methyl ethyl carbonate (EMC) and ethylene carbonate (EC) were mixed at a mixing volume ratio of 7:3 and LiPF$_6$ of 1.0 M concentration was dissolved, was injected. Thereafter, it is left to stand for 24 hours to manufacture a lithium coin half-cell.

Figure 2:
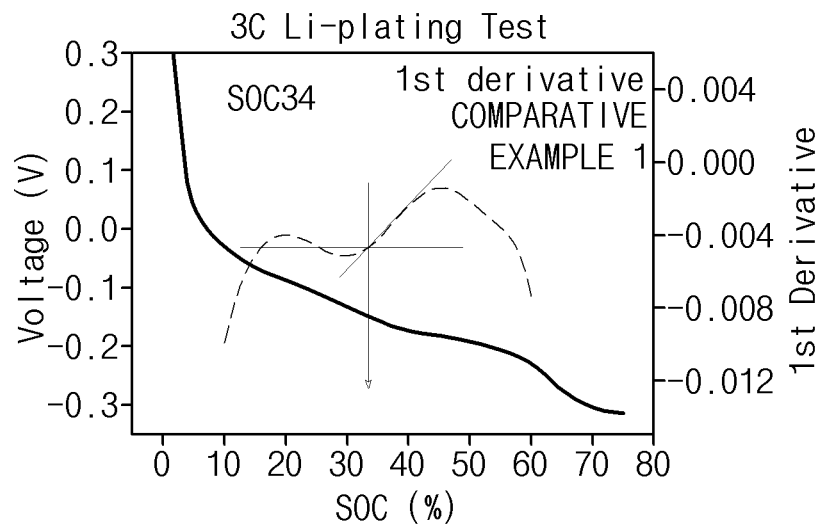
FIG. 2 is a graph showing the change in voltage when charging a battery manufactured by using the negative electrode of each of Example 1 and Comparative Example 1.
Figure 2:
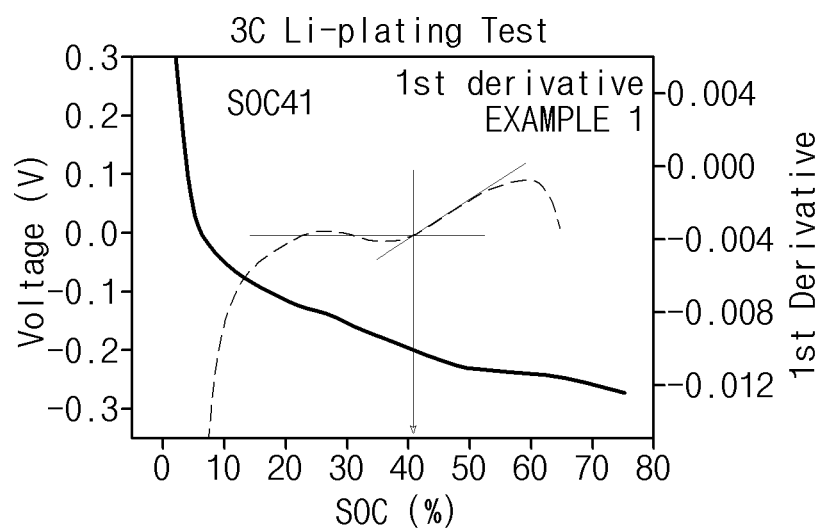

The manufactured half-cell was charged/discharged with 0.1 C for three times, and then, while performing charging for 15 minutes in a CC mode (3 C) based on the discharge capacity after the third cycle of 1 C, the output voltage according to SOC change was represented with a graph (see FIG. 2). The X-axis shows SOC and the Y-axis shows the measured output voltage in the graph, and using a method for determining Li plating SOC by locating a slope change point through a dV/dQ derivative. rapid charging performance was evaluated.

Referring to Table 2, it can be seen that in the case of Examples 1 in which negative electrode active material particles satisfying a proper D$_{50}$, half-width, and specific surface area were used, lithium precipitation occurred late.

The invention claimed is:

1. A negative electrode comprising:
a current collector; and
a negative electrode active material layer,
wherein the negative electrode active material layer comprises negative electrode active material particles,
wherein the negative electrode active material particles comprise natural graphite particles and a carbon coating layer disposed on the natural graphite particles,
wherein the negative electrode active material particles have a D$_{50}$ of 6 μm to 9.2 μm and a half-width of 5.0 μm to 5.5 μm based on a particle size distribution, and
wherein a specific surface area of the negative electrode active material particles is from 0.6 m$^2$/g to 2.2 m$^2$/g.

2. The negative electrode of claim 1, wherein the negative electrode active material particles have a D$_{50}$ of 7 μm to 9.2 μm based on the particle size distribution.

3. The negative electrode of claim 1, wherein the specific surface area of the negative electrode active material particles is from 0.8 m$^2$/g to 2.1 m$^2$/g.

4. The negative electrode of claim 1, wherein the negative electrode active material particles have a D$_{90}$/D$_{10}$ of $1.5 \leq D_{90}/D_{10} \leq 2.3$ based on the particle size distribution.

5. The negative electrode of claim 1, wherein the natural graphite comprises natural graphite formed by aggregating flaky natural graphite particles.

6. The negative electrode of claim 1, wherein a tap density of the negative electrode active material particles is from 1.00 g/cc to 1.20 g/cc.

7. The negative electrode of claim 1, wherein a pore volume of the negative electrode active material particles is from $1 \times 10^{-3}$ cm$^3$/g to $14.8 \times 10^{-3}$ cm$^3$/g.

8. The negative electrode of claim 1, wherein the carbon coating layer is present in the negative electrode active material particles in an amount of from 1 wt % to 15 wt %.

9. The negative electrode of claim 1, wherein the carbon coating layer comprises at least one of amorphous carbon or crystalline carbon.

10. A secondary battery comprising the negative electrode of claim 1.

* * * * *